United States Patent
Yang

(10) Patent No.: US 7,466,567 B2
(45) Date of Patent: Dec. 16, 2008

(54) HALF-BRIDGE CCFL DRIVING APPARATUS

(75) Inventor: Hui-Chiang Yang, Hsintien (TW)

(73) Assignee: Niko Semiconductor Co., Ltd., Taipei (TW)

( * ) Notice: Subject to any disclaimer, the term of this patent is extended or adjusted under 35 U.S.C. 154(b) by 285 days.

(21) Appl. No.: 11/546,295

(22) Filed: Oct. 12, 2006

(65) Prior Publication Data

US 2008/0089099 A1  Apr. 17, 2008

(51) Int. Cl.
*H02M 3/335* (2006.01)
*H02M 3/24* (2006.01)
*H02M 7/5387* (2007.01)

(52) U.S. Cl. .............................. 363/17; 363/98; 363/132

(58) Field of Classification Search .................. 363/16, 363/17, 97, 98, 131, 132; 315/209 R, 219, 315/221, 223
See application file for complete search history.

(56) References Cited

U.S. PATENT DOCUMENTS

| | | | | |
|---|---|---|---|---|
| 5,055,993 A | * | 10/1991 | Miyata et al. | 363/98 |
| 6,351,401 B1 | * | 2/2002 | Scheel et al. | 363/98 |
| 6,396,716 B1 | * | 5/2002 | Liu et al. | 363/17 |
| 6,400,584 B1 | * | 6/2002 | Sabate et al. | 363/22 |
| 6,829,151 B2 | * | 12/2004 | Elferich et al. | 363/17 |
| 7,321,205 B2 | * | 1/2008 | Hsieh | 315/291 |

* cited by examiner

*Primary Examiner*—Matthew V Nguyen
(74) *Attorney, Agent, or Firm*—Rosenberg, Klein & Lee

(57) ABSTRACT

A half-bridge CCFL driving apparatus uses a bridge rectifier to convert AC into a DC voltage and stores the DC voltage in a capacitor unit. The capacitor unit averages the DC voltage into two voltages that are equal for outputting. Then, the primary winding of the transformer is connected with the capacitor unit via a half-bridge switch to obtain the two equal voltages. The secondary winding of the transformer is connected with at least one harmonic capacitor. The PWM controller driving the half-bridge switch via an isolated driving element by turns means to transmit the two equal voltage outputted from the capacitor unit to the primary winding of the transformer by turns. Then, the serial leakage inductance produced at the secondary winding of the transformer works with the harmonic capacitors to generate a continuous sinewave voltage that is supplied to the CCFL.

7 Claims, 6 Drawing Sheets

HALF-BRIDGE CCFL DRIVING APPARATUS

BACKGROUND OF THE INVENTION

1. Field of the Invention

The present invention relates to a half-bridge CCFL driving apparatus. In particular, this invention relates to a driving apparatus for driving CCFLs.

2. Description of the Related Art

The power supply of the backlight of TFT panels usually adopts an inverter circuit to convert the energy and drive the CCFL. The inverter circuit of the prior art can be divided into a half-bridge inverter circuit, a full-bridge inverter circuit and a push-pull inverter circuit. The inverter circuit converts DC into AC.

Please refer to FIG. 1, which shows a schematic diagram of the circuit of a power supply for the backlight of TFT panel. In the circuit, the backlight of the LCD panel is composed of an AC-DC converter 10 and a DC-AC inverter 20 that are connected to each other in series. The AC-DC converter 10 receives an AC power. The AC power flows through the bridge rectifier BD1 and a high-voltage capacitor C1 to form a high-voltage DC voltage on the high-voltage capacitor C1. The PWM controller 12 located on the primary side of the transformer T1 controls the switching element SW1 to generate a high speed switching operation. Therefore, the high-voltage DC voltage is transmitted to the transformer T1. The transformer T1 transfers the power to the secondary winding of the transformer T1. Then, the voltage is filtered via a regulating diode D1 and a filtering capacitor C4 to form a DC voltage VDD on the filtering capacitor C4 that is between 12V to 24V. The DC voltage is supplied to the DC-AC inverter 20. The capacitors C5 and C6 in the DC-AC inverter 20 average the voltage on the filtering capacitor C4. Therefore, the voltage for each of the capacitors C5 and C6 is a half of the voltage on the filtering capacitor C4.

When the PWM controller 14 switches the switching element SW2 on, the voltage on the capacitor C5 provides power from the positive port of the capacitor C5. Then, the power flows through the switching element SW2, the capacitor C7 and the primary winding of the transformer T2 and comes back to the negative port of the capacitor C5. When the PWM controller 14 switches the switching element SW3 on, the voltage on the capacitor C6 provides power from the positive port of the capacitor C6. Then, the power flows through the primary winding of the transformer T2, the capacitor C7 and the switching element SW3 and comes back to the negative port of the capacitor C6. The PWM controller 14 generates a pulse control signal with 180 degrees phase to execute a high-speed switching operation to the switching elements SW2 and SW3. The transformer T2 transfers the power to the secondary winding of the transformer T2 and utilizes the serial leakage inductance produced at the secondary winding of the transformer T2 to work with the resonant capacitors C9, C10. Therefore, a continuous sine-wave voltage is generated and supplied to the CCFL.

Please refer to FIG. 1 again. If the efficiency of the AC-DC converter 10 and the DC-AC inverter 20 both are 85%, then the total efficiency of the serial circuit is 72.2%. The total efficiency is decreased.

SUMMARY OF THE INVENTION

The half-bridge CCFL driving apparatus of the present invention integrates the AC-DC converter and the DC-AC inverter into an AC-AC inverter. Thereby, the total efficiency is above 85%, and it is to be increased 12.8% higher than the prior art.

The half-bridge CCFL driving apparatus of the present invention uses a bridge rectifier to convert AC into a DC voltage, and stores the DC voltage in a capacitor unit. The capacitor unit averages the DC voltage into two voltages that are equal for outputting. Then, the present invention uses the primary winding of the transformer to connect with the capacitor unit via a half-bridge switch to obtain the two equal voltages. The secondary winding of the transformer is connected with at least one resonant capacitor for transmitting power to the CCFLs via the resonant capacitor. Furthermore, a PWM controller is connected with the resonant capacitors and the CCFLs to obtain the feedback values of the operation current and the operation voltage of the CCFLs. Then, the PWM controller, based on the feedback values, drives the half-bridge switch via an isolated driving element.

The PWM controller driving the half-bridge switch via an isolated driving element by turns means to transmit the two equal voltage outputted from the capacitor unit to the primary winding of the transformer by turns. (The PWM controller drives the half-bridge switch via an isolated driving element by turning/in turn. In other words, two equal voltages are transmitted and outputted from the capacitor unit to the primary winding of the transformer in turn.) Then, the serial leakage inductance produced at the secondary winding of the transformer works with the resonant capacitors to generate a continuous sine-wave voltage for being supplied to the CCFL.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
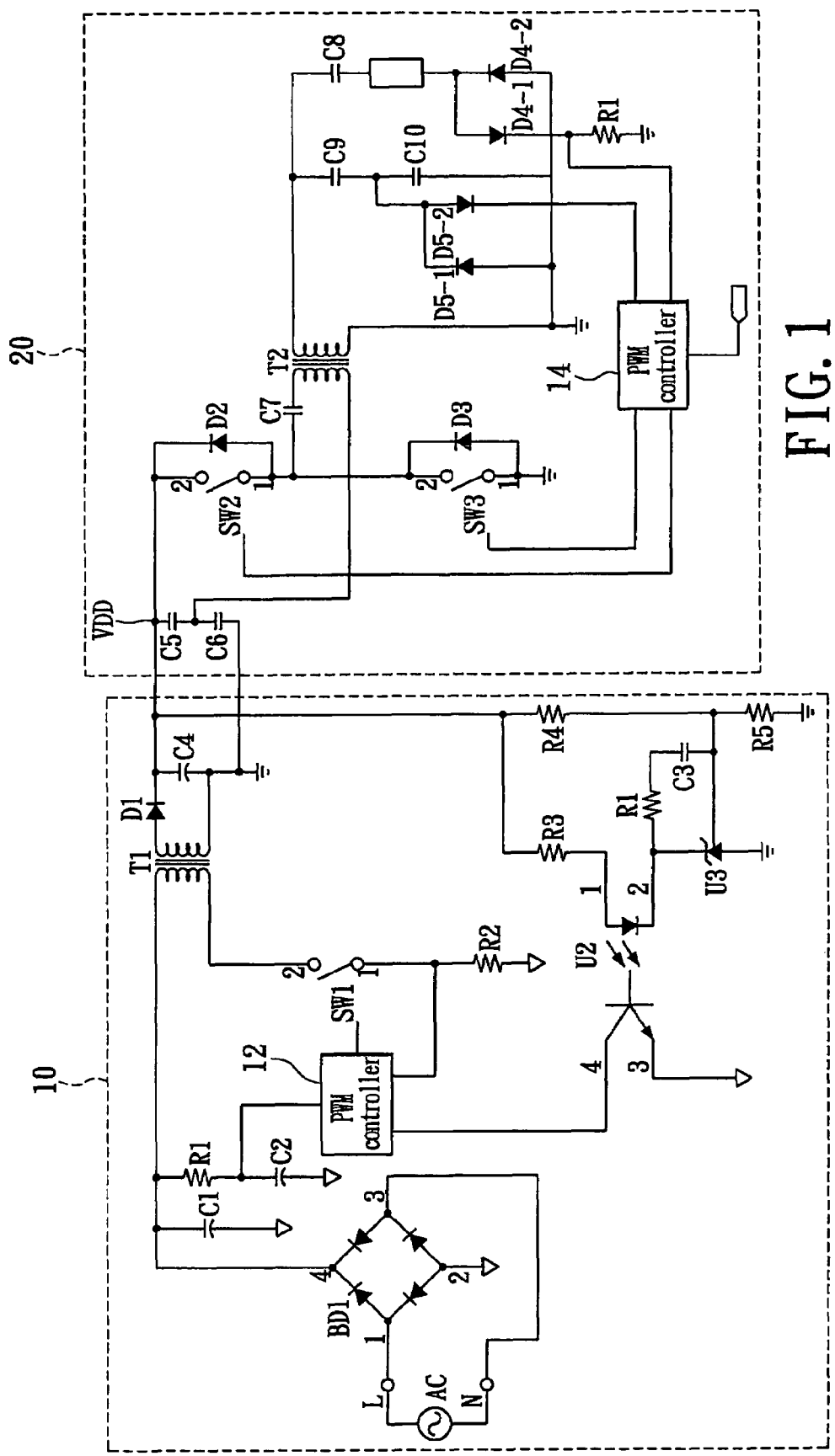
FIG. 1 is a schematic diagram of the circuit of power supply of the backlight of TFT panel of the prior art.
Figure 2:
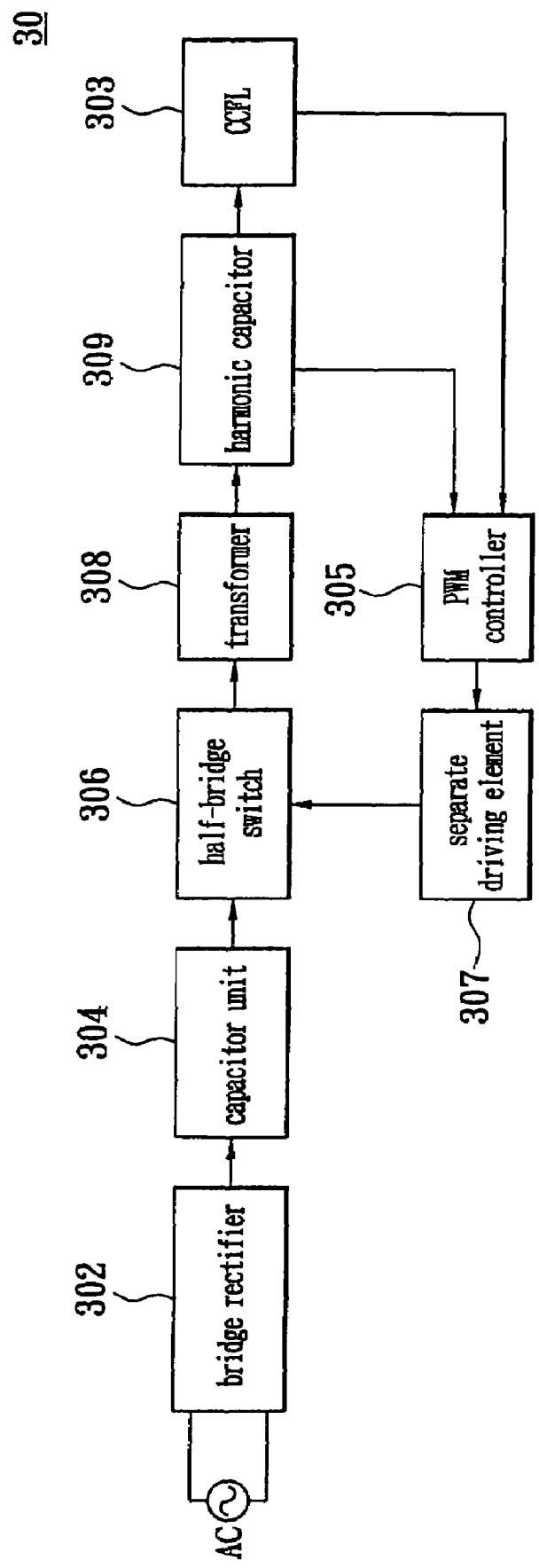
FIG. 2 is a block diagram of the circuit of the present invention.

Please refer to FIG. 2, which shows a block diagram of the circuit of the present invention. The half-bridge CCFL driving apparatus 30 of the present invention is used for driving at least one CCFL. The present invention uses a bridge rectifier 302 to convert AC into a DC voltage and stores the DC voltage in a capacitor unit 304. The capacitor unit 304 averages the DC voltage into two voltages that are equal to each other.

The present invention further includes at least one transformer 308 having a primary winding and a secondary winding. The primary winding is connected with the capacitor unit 304 via a half-bridge switch 306. The present invention also includes at least one resonant capacitor 309. The resonant capacitors are individually connected to the secondary winding of the transformers 308 and the CCFLs 303. A PWM controller 305 is connected to the resonant capacitors 309 and the CCFLs 303 to obtain the feedback values of the operation current and the operation voltage from the CCFLs 303. The PWM controller 305, based on these feedback values, drives the half-bridge switch 306 via an isolated driving element 307.

The PWM controller 305 driving the half-bridge switch 306 via the isolated driving element 307 by turns means to transmit the two equal voltage outputted from the capacitor unit 304 to the primary winding of the transformers 308 by turns. Then, the serial leakage inductance produced at the secondary winding of the transformers 308 works with the resonant capacitors 309 to generate a continuous sine-wave voltage that is supplied to the CCFLs 303.

Figure 3:
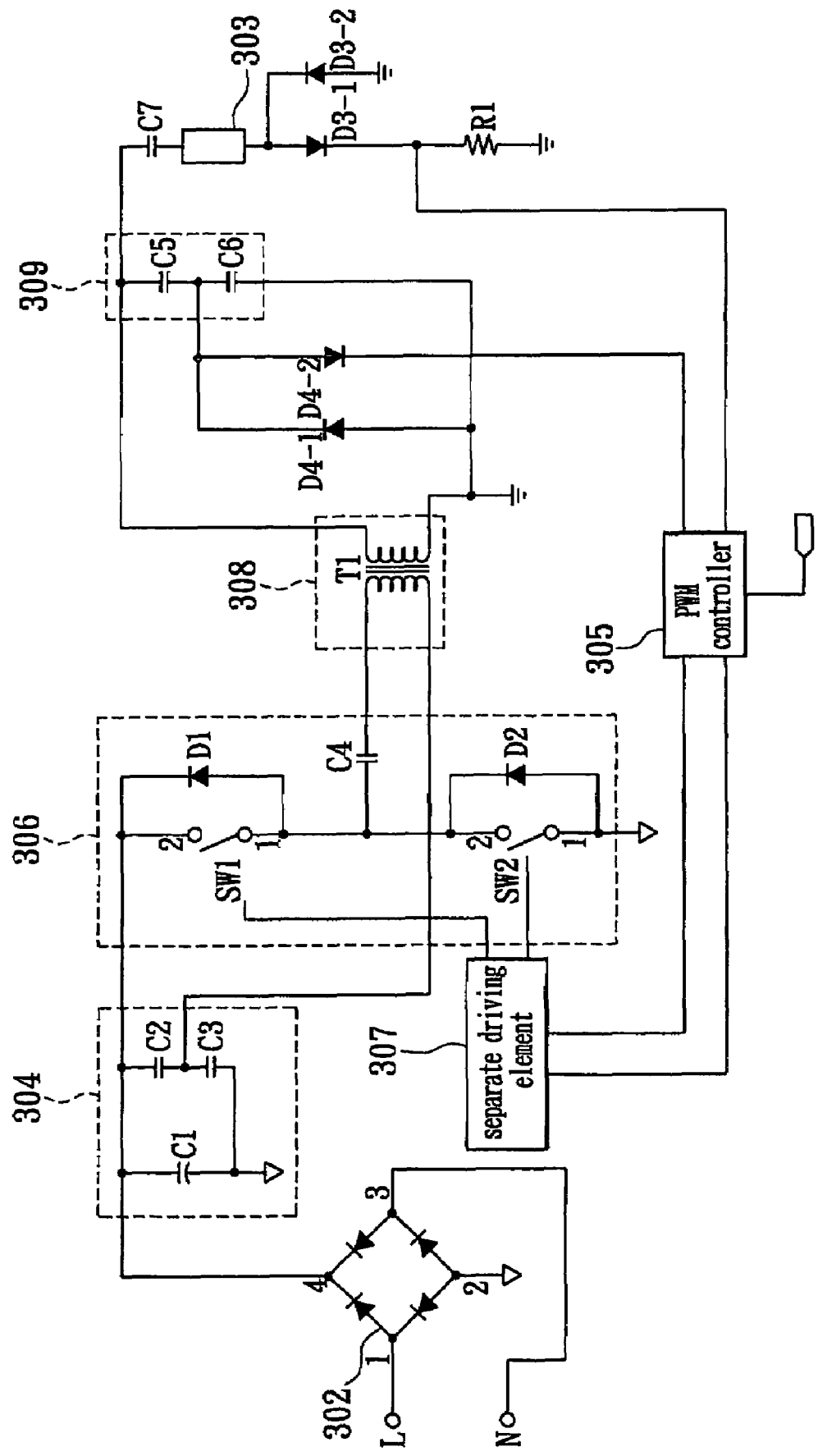
FIG. 3 is a schematic diagram of the circuit driving a single CCFL of the first embodiment of the present invention.

Please refer to FIG. 2 and FIG. 3 that show a schematic diagram of the circuit driving a single CCFL of the first embodiment of the present invention. The operating principle of the circuit of the first embodiment is the same as the one described for the block diagram. The bridge rectifier 302 is a full-bridge rectifier. The capacitor unit 304 is composed of a high-voltage capacitor C1 and two divided-voltage capacitors C2 and C3. The divided-voltage capacitor C2 is connected with the divided-voltage capacitor C3 in series, and the high-voltage capacitor C1 is connected with the serial divided-voltage capacitors C2, C3 in parallel. The two serial divided-voltage capacitors C2, C3 average the DC voltage into two equal voltages for outputting. There is a balance capacitor C4 connected between the primary winding of the transformer 308 and the half-bridge switch 306. The half-bridge switch 306 is composed of switches SW1 and SW2.

Please refer to FIG. 3 again. The AC power flows through the bridge rectifier 302 and the high-voltage capacitor C1 and forms a DC voltage in the high-voltage capacitor C1. Then, the DC voltage is averaged by the divided-voltage capacitors C2, C3 into two equal voltages to be output. The PWM controller 305 obtains the feedback values of the operation current and the operation voltage of the CCFL 303. Then, the PWM controller 305 drives the switches SW1, SW2 via an isolated driving element 307 by turns according to the feedback values. The PWM controller 305 controls the switches SW1, SW2 on or off for transmitting the voltage on the divided-voltage capacitors C2, C3 to the primary winding of the transformer 308. Furthermore, the serial leakage inductance produced at the secondary winding of the transformers 308 works with the resonant capacitors 309 to generate a continuous sine-wave voltage that is supplied to the CCFL 303.

When the PWM controller 305 controls the switching element SW1 on, the voltage on the capacitor C2 provides power from the positive port of the capacitor C2 and flows through the switching element SW1, the capacitor C4, and the primary winding of the transformer 308. Then, returns to the negative port of the capacitor C2. When the PWM controller 305 controls the switching element SW2 on, the voltage on the capacitor C3 provides power from the positive port of the capacitor C3 and flows through the primary winding of the transformer 308, the capacitor C4, and the switching element SW2. Then, returns to the negative port of the capacitor C3. The PWM controller 305 generates two opposite pulse control signal with 180 degrees phase to execute a high-speed switching operation to the switching elements SW1 and SW2. Then, the transformer 308 transfers the power to the secondary winding of the transformer 308 and utilizes the serial leakage inductance produced at the secondary winding of the transformer 308 to work with the resonant capacitors C5, C6. Therefore, a continuous sine-wave voltage is generated and supplied to the CCFL.

Figure 4:
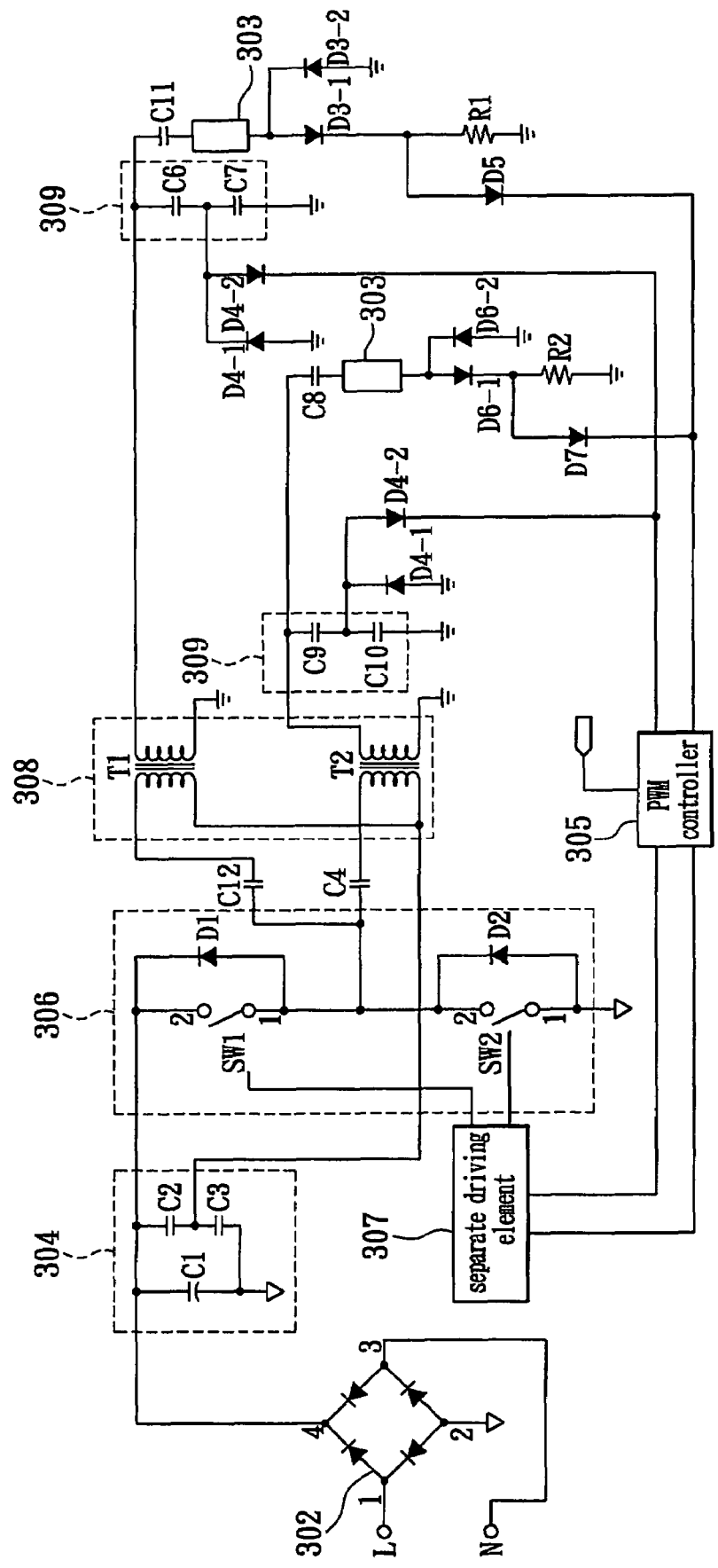
FIG. 4 is a schematic diagram of the circuit driving a plurality of CCFLs of the second embodiment of the present invention.

Please refer to FIGS. 3 and 4. FIG. 4 shows a schematic diagram of the circuit driving a plurality of CCFLs of the second embodiment of the present invention. The operating principle of the circuit of the second embodiment is the same as the operating principle of the first embodiment, and the difference is that the second embodiment drives a plurality of CCFLs. The quantity of the transformers 308 is determined by the quantity of CCFLs. Therefore, in the second embodiment, the primary windings of the transformers 308 are connected to each other in parallel to drive the plurality of CCFLs. There are balance capacitors C4, C12 individually connected between the primary winding of the transformers 308 and the half-bridge switch 306 for compensating the two equal voltages.

Figure 5:
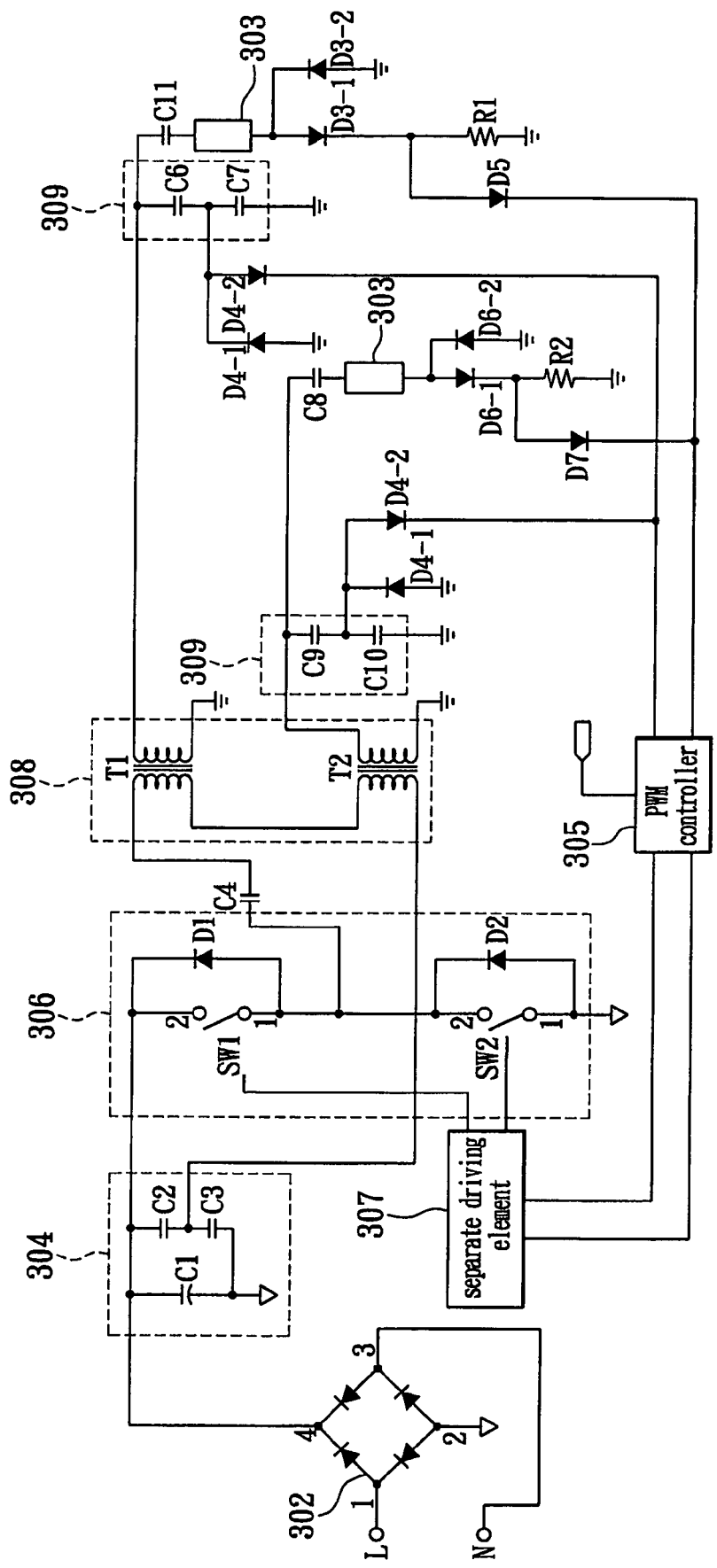
FIG. 5 is a schematic diagram of the circuit driving a plurality of CCFLs of the third embodiment of the present invention.

In the third embodiment, as shown in FIG. 5, the primary windings of the transformers 308 are connected to each other in series to drive the plurality of CCFLs. There is a balance capacitor C4 connected between the primary winding of the transformers 308 and the half-bridge switch 306 for compensating the two equal voltages.

Figure 6:
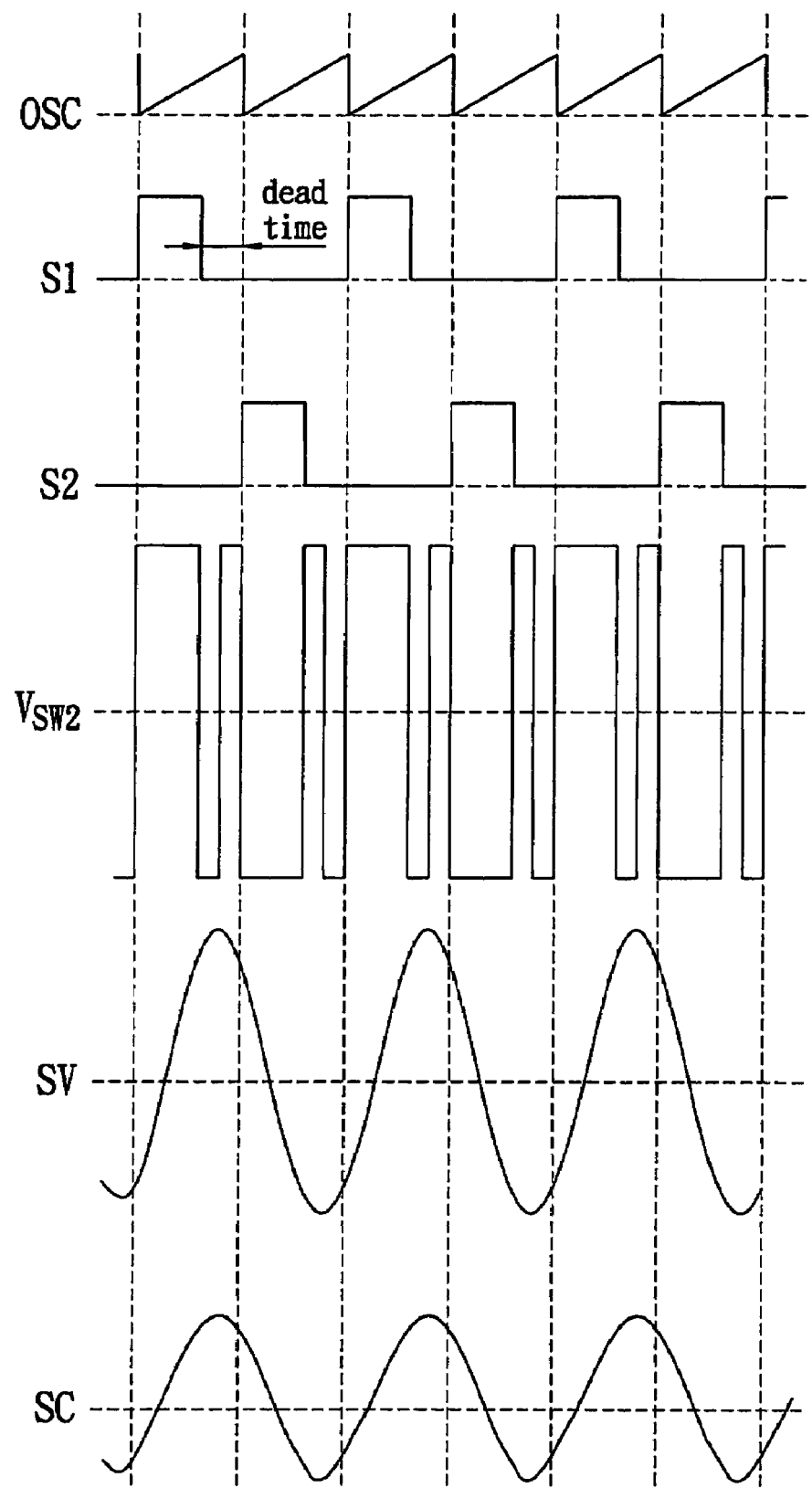
FIG. 6 is a schematic diagram of the waveforms of the circuit of the present invention.

Please refer to FIGS. 3 and 6. FIG. 6 shows a schematic diagram of the waveforms of the circuit of the present invention. The PWM controller 305 generates an oscillation signal OSC via an oscillator (not shown in the figure) and synchronously generates pulse control signals with 180 degrees phase S1, S2 according to the oscillation signal OSC. The pulse control signals with 180 degrees phase S1, S2 individually execute a high-speed switching operation to the switching elements SW1 and SW2 periodically in turn. A dead time exists between the pulse control signals S1, S2 for preventing the switching elements SW1 and SW2 from being on at the same time to avoid a short circuit condition from occurring. When the pulse control signals S1 controls the switching element SW1 on, the voltage Vsw2 on the two ends of the switching element SW2 is the voltage on the capacitor C2. When the pulse control signals S2 controls the switching element SW2 on, the voltage Vsw2 on the two ends of the switching element SW2 is the voltage on the capacitor C3. The voltage Vsw2 on the two ends of the switching element SW2 reacts with the serial leakage inductance at the secondary winding of the transformer 308 and the resonant capacitors 309 to generate a sine-wave voltage signal.

The voltage Vsw2 on the two ends of the switching element SW2 is outputted and transmitted to the primary winding of the transformer 308. At the same time, the serial leakage inductance produced at the secondary winding of the transformer 308 works with the resonant capacitor 309 to generate a continuous sine-wave voltage SV and a sine-wave current for being supplied to the CCFL 303.

The half-bridge CCFL driving apparatus of the present invention integrates the AC-DC converter 10 and the DC-AC inverter 20 into an AC-AC inverter. Thereby, the total efficiency is above 85%, and it is increased 12.8%/an increase of 12.8% compared to the prior art. The present invention solves the drawback of the prior art—that the total efficiency is decreased due to the AC-DC converter 10 being connected with the DC-AC inverter 20 in series.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A half-bridge CCFL driving apparatus, used for driving at least one CCFL, comprising:
    a bridge rectifier converting AC into a DC voltage;
    a capacitor unit connected with the bridge rectifier and storing the DC voltage, and averaging the DC voltage into two equal voltage to output;
    at least one transformer having a primary winding and a secondary winding, wherein the primary winding of the transformer is connected with the capacitor unit via a half-bridge switch;
    at least one resonant capacitor individually connected with the secondary winding of the transformer and the CCFLs; and
    a PWM controller connected with the resonant capacitors, the CCFLs, and the half-bridge switch to obtain the feedback values of the operation current and the operation voltage of the CCFLs, wherein the PWM controller drives the half-bridge switch via an isolated driving element according the feedback values;
    wherein the PWM controller driving the half-bridge switch via the isolated driving element by turns means to transmit the two equal voltages outputted from the capacitor unit to the primary winding of the transformer by turns, and the serial leakage inductance produced at the secondary winding of the transformer works with the resonant capacitors to generate a continuous sine-wave voltage that is supplied to the CCFL.

2. The half-bridge CCFL driving apparatus as claimed in claim 1, wherein the bridge rectifier is a full-bridge rectifier.

3. The half-bridge CCFL driving apparatus as claimed in claim 1, wherein the capacitor unit is composed of a high-voltage capacitor and two divided-voltage capacitors, wherein the divided-voltage capacitors are connected together in series and the high-voltage capacitor is connected with the serial divided-voltage capacitors in parallel, and the two serial divided-voltage capacitors averages the DC voltage into two equal voltages to output.

4. The half-bridge CCFL driving apparatus as claimed in claim 1, wherein the primary windings of the transformers are connected together in parallel.

5. The half-bridge CCFL driving apparatus as claimed in claim 1, wherein the primary windings of the transformers are connected together in series.

6. The half-bridge CCFL driving apparatus as claimed in claim 4, wherein a balance capacitor is individually connected between the primary winding of the transformer and the half-bridge switch to compensate the two equal voltages.

7. The half-bridge CCFL driving apparatus as claimed in claim 5, wherein a balance capacitor is connected between the primary winding of the transformer and the half-bridge switch to compensate the two equal voltages.

* * * * *